United States Patent [19]

Chan

[11] Patent Number: 5,071,213
[45] Date of Patent: Dec. 10, 1991

[54] OPTICAL COUPLER AND METHOD OF MAKING OPTICAL COUPLER

[75] Inventor: Eric Y. Chan, Mercer Island, Wash.
[73] Assignee: The Boeing Company, Seattle, Wash.
[21] Appl. No.: 607,991
[22] Filed: Oct. 31, 1990
[51] Int. Cl.[5] .......................... G02B 6/26; G02B 6/42
[52] U.S. Cl. ........................................ 385/52; 385/38
[58] Field of Search ............. 350/96.11, 95.15, 96.18, 350/96.17

[56] References Cited

U.S. PATENT DOCUMENTS

| | | | |
|---|---|---|---|
| 3,896,305 | 7/1975 | Ostrowsky et al. | 350/96.11 |
| 4,756,590 | 7/1988 | Forrest et al. | 350/96.16 |
| 4,879,250 | 11/1989 | Chan | 437/3 |
| 4,897,711 | 1/1990 | Blonder et al. | 350/96.18 |
| 4,916,497 | 4/1990 | Gaul et al. | 350/96.11 |
| 4,945,400 | 7/1990 | Blonder et al. | 350/96.20 |
| 4,981,334 | 1/1991 | Sniadower | 350/96.20 |

OTHER PUBLICATIONS

"Anisotropic Etching of Silicon," Kenneth E. Bean, Transactions on Electron Devices, vol. ED-25, No. 10, Oct. 1978, pp. 1185-1193.
"Self-Aligned Flat-Pack Fibre-Photodiode Coupling," B. Hillerich and A. Geyer, Electronics Letters, Jul. 21, 1988, vol. 24, No. 15, pp. 918-919.
"Single-Mode Fiber WDM Unit for Duplex Subscriber Link Using a Substrate with Embossed Alignment Grooves," B. Hillerich, M. Rode and H. Gottsmann, Journal of Lightwave Technology, vol. 7, No. 11, Nov. 1989, pp. 1654-1660.

Primary Examiner—William L. Sikes
Assistant Examiner—Robert E. Wise
Attorney, Agent, or Firm—Christensen, O'Connor, Johnson & Kindness

[57] ABSTRACT

An optical coupler for coupling light between an end of a fiber-optic cable and the optical port of an electro-optic device, and an improved method for making the coupler. A silicon substrate is etched to form a groove dimensioned to hold the fiber-optic cable, with the end of the fiber-optic cable adjacent to the terminating surface of the groove. Alignment means are then formed on the working surface, and used to secure positioning means to the substrate at a predetermined position. The positioning means includes a positioning surface oriented to abut a reference surface of the electro-optic device. The electro-optic device is then mounted on the working surface, with its reference surface abutting the positioning surface. The alignment means is formed so that the optical port is positioned to efficiently couple light between the end of the fiber-optic cable and the optical port, via a reflection off the terminating surface. The positioning means may include a pair of positioning surfaces, for two-dimensional positioning. The alignment means may comprise a plate formed on the working surface, or a recess formed in the working surface.

12 Claims, 6 Drawing Sheets

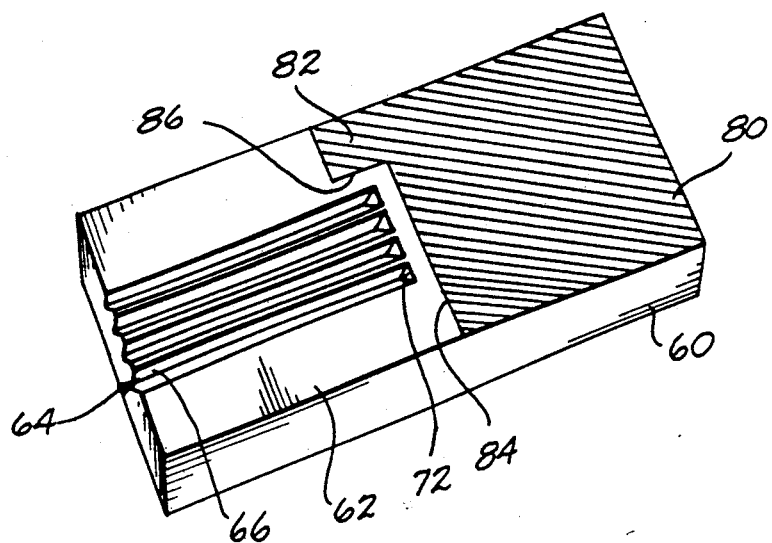
Fig. 3.
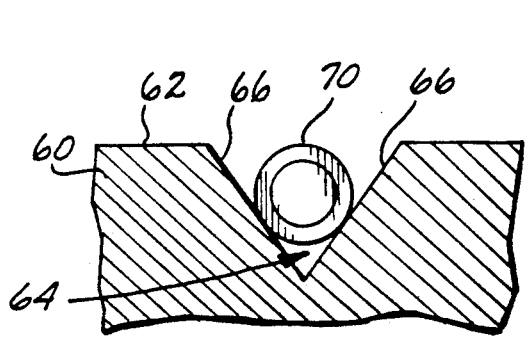 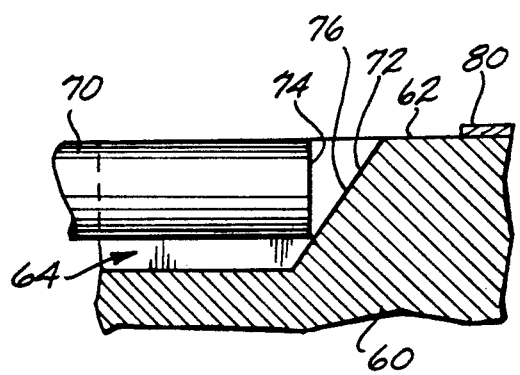
Fig. 4. Fig. 5.

OPTICAL COUPLER AND METHOD OF MAKING OPTICAL COUPLER

FIELD OF THE INVENTION

The present invention relates to connectors for coupling fiber-optic cables to electro-optic devices such as photodiodes and LEDs, and to techniques for fabricating such connectors.

BACKGROUND OF THE INVENTION

The use of fiber-optic cables has resulted in significant advances in telecommunications, sensing technology, and related fields. However, one persistent problem attending the use of fiber-optic cables is that of coupling. The end of a fiber-optic cable must be mounted adjacent to the photodetector used to convert the light exiting the fiber-optic cable into an electrical signal, or adjacent to the optical source used for launching light into the fiber-optic cable. In addition to providing mechanical support, the mounting arrangement must also provide for the efficient coupling of light between the fiber-optic cable end and the device. Because of the very small tolerances involved, it has not proved easy to design a coupler that is both efficient and inexpensive to manufacture.

Recently, there has been strong interest in using PIN photodetector arrays for optical interconnect applications. However, the high cost of array packaging is always a concern for system engineers. Presently, a common technique for interfacing a group of fiber-optic cables to a PIN photodetector array involves the sandwiching of the fibers between two pieces of silicon containing V-grooves, and angle lapping and polishing the fiber ends. However, both of these steps are labor-intensive and time-consuming, and there is a particular need for improved fiber-optics electronics coupling technologies where multiple, parallel interconnect must be made.

One class of electro-optic devices are those in which the optical port of the device, i.e., the effective light absorbing or light emitting area on the surface of the device, is positioned on the bottom of the device. The term "bottom" here refers to the orientation of the device as it is normally mounted on a support. Devices with downward facing optical ports present their own special set of interface problems. In one previously proposed approach to interfacing such devices, the fiber-optic cable is positioned in a groove that extends part of the way across the surface of a substrate, with the end of the fiber-optic cable adjacent to the terminating surface at the end of the groove. The electro-optic device is positioned such that its optical port is directly above the end of the groove. Light exiting from the fiber-optic cable is reflected off the terminating face, and upward into the optical port of the electro-optic device. Although the described coupling technique is effective, a difficult problem remains in correctly aligning the electro-optic device on the substrate, such that its optical port is correctly positioned with respect to the terminating face of the groove.

SUMMARY OF THE INVENTION

The present invention provides an improved optical coupler for coupling light between an end of a fiber-optic cable and the optical port of an electro-optic device, and an improved method of making such a coupler.

The process of making the coupler begins with a substrate having a working surface. A preferred substrate material is silicon. A groove is formed in the working surface, the groove being dimensioned such that the fiber-optic cable can be positioned in the groove with the end of the fiber-optic cable adjacent to the terminating surface of the groove. Alignment means are then formed on the working surface, and the alignment means is used to secure positioning means to the substrate at a predetermined position. The positioning means includes a positioning surface that is oriented to abut a reference surface of the electro-optic device. The electro-optic device is then mounted on the working surface, with its reference surface abutting the positioning surface. The alignment means is formed so that when the above steps are complete, the optical port is positioned so as to efficiently couple light between the end of the fiber-optic cable and the optical port, via reflection off the terminating surface. The positioning means may include a pair of positioning surfaces oriented to abut a pair of reference surfaces on the electro-optic device, for accurately positioning the electro-optical device in two dimensions.

In a first preferred embodiment, the alignment means comprises a plate formed on the working surface, the plate having an alignment edge. The step of securing the positioning means to the substrate comprises aligning the positioning surface with the alignment edge. In a second preferred embodiment, the alignment edge is formed by etching a recess into the working surface of the substrate. Also described are ways to apply this technique to the coupling of a plurality of fiber-optic cables to a plurality of electro-optic devices in an array.

BRIEF DESCRIPTION OF THE DRAWINGS

FIG. 3 is a perspective view showing an etched and plated substrate in accordance with the present invention;

FIG. 4 is a schematic cross-sectional view showing a fiber-optic cable in a groove;

FIG. 5 is a schematic cross-sectional view showing the positioning of the end of a fiber-optic cable in the groove;

DETAILED DESCRIPTION OF THE PREFERRED EMBODIMENT

Figure 1:
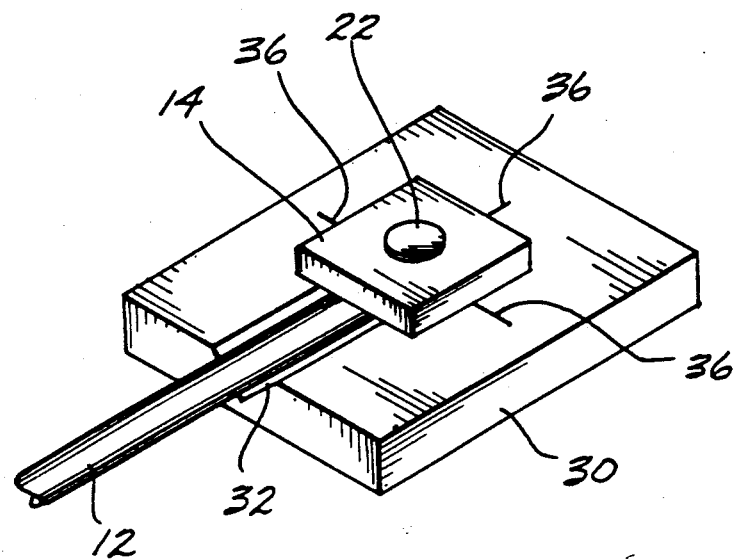
FIG. 1 is a schematic view of an optical coupler of the type to which the present invention may be applied.
Figure 2:
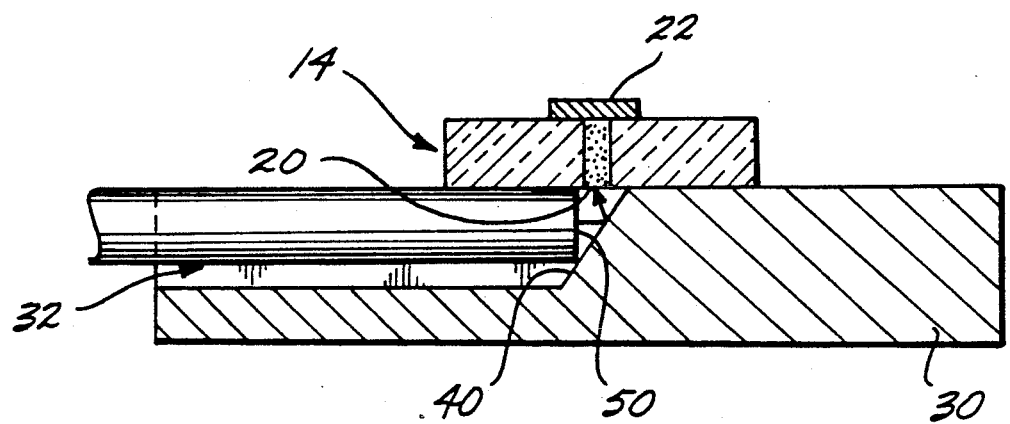
FIG. 2 is a schematic cross-sectional view of a portion of the coupler shown in FIG. 1.

FIGS. 1 and 2 illustrate an optical coupler of the general type to which the present invention may be applied. The coupler serves to provide for the coupling of optical signals between fiber-optic cable 12 and electro-optic device 14. Electro-optic device 14 has an active, light emitting or light absorbing surface 20 (i.e., an optical port) on its lower surface, and a terminal 22 positioned on its upper surface. Device 14 is positioned on substrate 30 that includes a groove 32 that is sized to receive fiber-optic cable 12.

FIG. 2 illustrates further details of the geometry of the coupler. Groove 32 ends at a terminating surface 40 that is inclined at an acute angle with respect to the substrate. Terminating surface 40 is coated with a suitable metal, so that the terminating face is reflective at the wavelengths at which the coupler will be operated. Fiber-optic cable 12 is positioned in groove 32, with end 50 of fiber-optic cable 12 being adjacent to terminating surface 40. Electro-optic device 14 is then positioned on substrate 30, using alignment marks 36 that have been etched into the substrate. If the positioning is done correctly, optical port 20 of the electro-optic device will be positioned directly above terminating face 40. As a result, light exiting from end 50 of fiber-optic cable 12 is reflected upward by surface 40 such that it enters device 14 at port 20.

The present invention provides an improved coupler for coupling one or more fiber-optic cables to one or more electro-optic devices, as well as improved techniques for fabricating such couplers. The electro-optic device could comprise one or more photodetectors such as PIN photodiodes, one or more optical sources such as surface-emitting LEDs or surface-emitting laser diodes, opto-electronic integrated circuits, etc. Referring initially to FIG. 3, an improved fabrication technique according to the present invention begins with a substrate 60 having an upper or working surface 62 on which the coupler will be formed. A preferred substrate material is silicon. One or more parallel, side-by-side grooves 64 are etched or otherwise formed in working surface 62, one groove for each fiber-optic cable. Four grooves are shown for simplicity of illustration, and more than four will often be used. FIGS. 4 and 5 illustrate the geometry of one of the grooves in relation to a fiber-optic cable 70 that will later be inserted into the groove. In a preferred geometry, each groove 64 comprises a pair of side surfaces 66 that combine to give the groove a V-shaped cross section. When the grooves are formed by anisotropic etching of a <100> silicon substrate, each side surface 66 lies at an angle of 55 degrees with respect to working surface 62. Preferably, the groove is dimensioned such that it can accommodate a fiber-optic cable 70 of the desired diameter, such that the upper side of the fiber-optic cable is approximately level with working surface 62.

As shown in FIG. 5, groove 64 includes a terminating surface 72 that also lies at an acute angle (e.g., 55 degrees) with respect to working surface 62. A metal (e.g., gold) film 76 is formed on terminating surface 72, to render it reflective. Fiber-optic cable 70 will be inserted into groove 64 such that end 74 of the fiber-optic cable will be positioned adjacent to terminating surface 72. As a result, light exiting from end 74 will be reflected in a general upward direction by terminating surface 72, and light directed downwardly onto terminating surface 72 will be reflected into end 74.

Referring again to FIG. 3, metal plate 80 is formed on a portion of working surface 62, for the purpose of allowing precise alignment of the components of the coupler. Metal plate 80 includes lateral extension 82 that extends alongside one end of the group of terminating surfaces 72 of grooves 64. This arrangement produces a pair of alignment edges 84, 86 that are at right angles to one another. Plate 80 is preferably formed photolithographically, such that edges 84 and 86 are linear and are precisely located on the working surface, as further described below.

Figure 6:
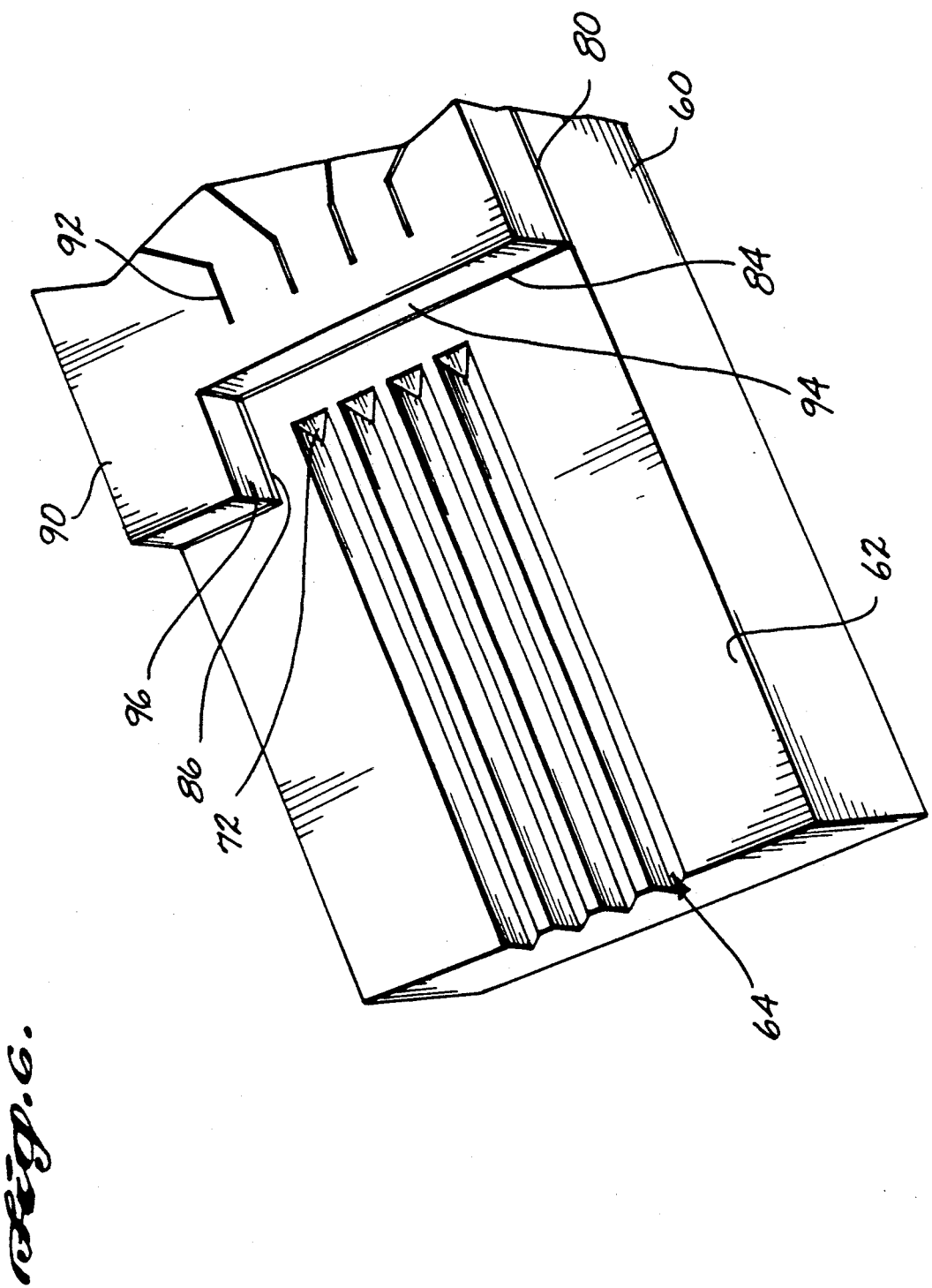
FIG. 6 is a schematic perspective view showing the positioning of the block on the substrate.

Referring now to FIG. 6, the next step in the process is to position block 90 on the upper surface of substrate 60, and in particular on metal plate 80, using edges 84 and 86 as guides. Block 90 includes positioning surfaces 94 and 96 that are congruent and parallel to edges 84 and 86 of plate 80. Block 90 is positioned such that positioning surfaces 94 and 96 are exactly aligned with edges 84 and 86, and the block is then secured to the metal plate with a suitable adhesive. The alignment of positioning surfaces 94 and 96 to edges 84 and 86 may be performed manually using a microscope, or automatically using machine vision technology. Preferably, block 90 comprises an insulating material such as alumina, and includes a pattern of conductive traces 92 on its upper surface in a fan-out pattern. Traces 92 may be used to connect the electro-optic device to other electrical circuitry.

Figure 7:
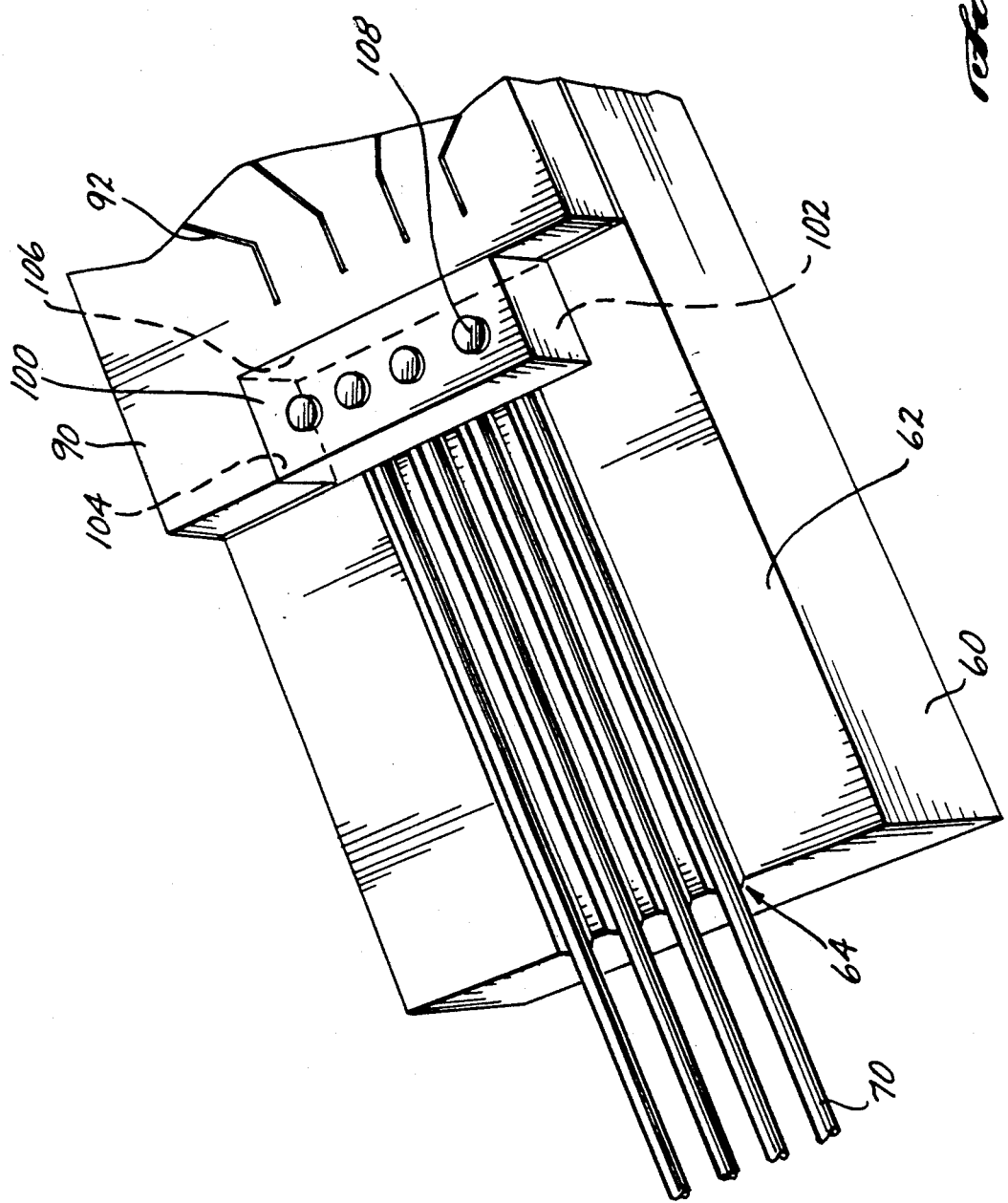
FIG. 7 is a schematic perspective view showing the fabricated coupling device.

Once block 90 has been secured to substrate 60, fiber-optic cables 70 may then be inserted and bonded in grooves 64, such that the fiber-optic cable ends are adjacent to terminating surfaces 72. Electro-optic array 100 is then positioned on substrate 60 using block 90 as a guide, as shown in FIG. 7. Electro-optic array 100 comprises four side-by-side electro-optic devices, e.g., four PIN photodiodes. The electro-optic array 100 includes a lower surface 102 that includes the active surfaces (i.e., the optical ports) of four electro-optic devices, as well as lateral reference surfaces 104 and 106 and terminals 108 on its upper surface. Lower surface 102 is positioned on working surface 62 of substrate 60, above terminating surfaces 72 of grooves 64, and the electro-optic array is moved laterally so that its reference surfaces 104 and 106 abut positioning surfaces 94 and 96 of block 90. The electro-optic array is then bonded to the substrate. The assembly of the coupling device may then continue with a series of conventional steps, such as wire bonding terminals 108 to traces 92, etc. It is possible to insert and bond the fiber-optic cables in the grooves after block 90 has been bonded to the substrate. However, the sequence described above is preferred, since it more readily permits verification that the fiber-optic cable ends are adjacent to the terminating surfaces.

Figure 8:
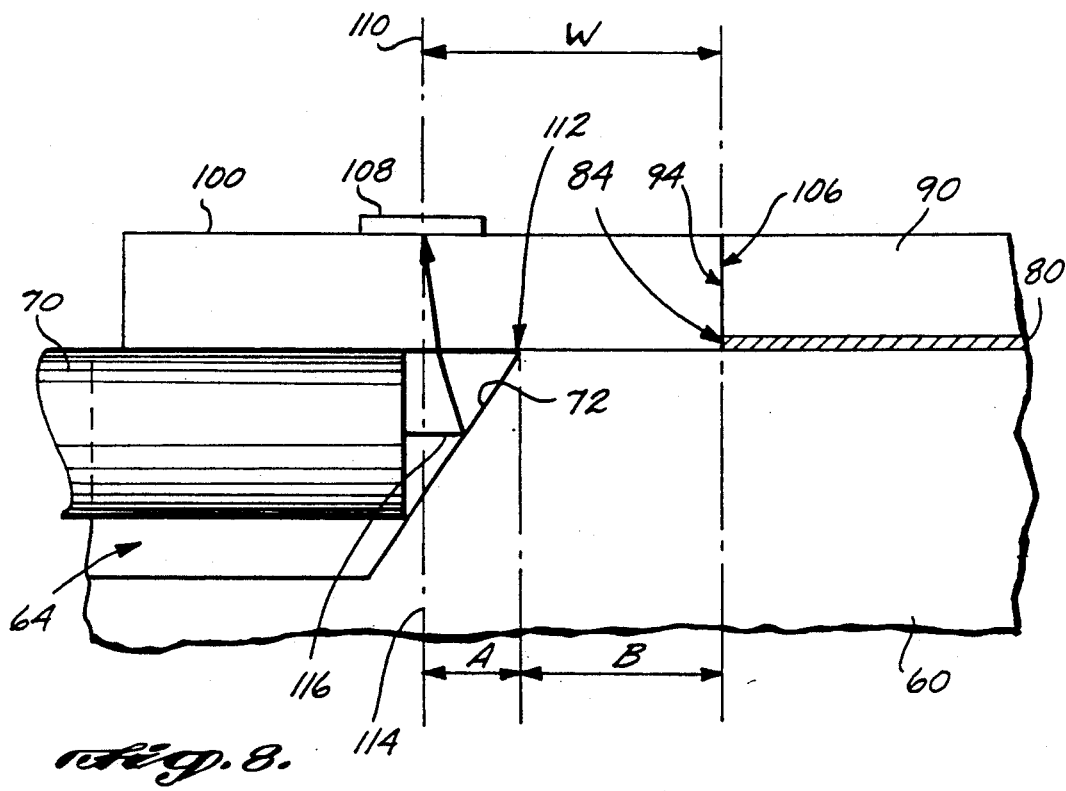
FIG. 8 is a schematic cross-sectional view showing the positioning of the fiber-optic cable end with respect to the electro-optic device.

FIG. 8 presents a schematic cross section of the device assembled as outlined above, illustrating the process of alignment in one of the two orthogonal alignment directions. If W is the distance between reference surface 106 and centerline 110 of electro-optic device 100, then the alignment criteria is $$W = A + B \tag{1}$$

A represents the distance from the innermost end 112 of groove 64 to target plane 114. The position of target plane 114 is preferably determined by the desired optical path for an optical ray 116 exiting from the center of fiber-optic cable 70. In FIG. 8, it is assumed that terminating surface 72 is oriented at an angle of 55°, and that ray 116 is refracted as it enters electro-optic device 100. Distance B in FIG. 8 is the distance between end 112 of groove 64 and alignment edge 84 of metal plate 80.

Working backward from FIG. 8, it can be seen that the position of electro-optic array 100 with respect to substrate 60 is ultimately determined by the position of metal plate 80 on substrate 60 in the metallization step. Since the metallization step may be performed photolithographically, the metal plate can be positioned with high accuracy. In general, it will be necessary to accurately position electro-optic array 100 in two orthogonal dimensions parallel to working surface 62, and metal plate 80 must therefore define two nonparallel alignment edges, such as edges 84 and 86 shown in FIG. 3. However, in an application in which only one dimensional positioning were required, the method of the present invention could obviously be applied starting with a single alignment edge.

Figure 10:
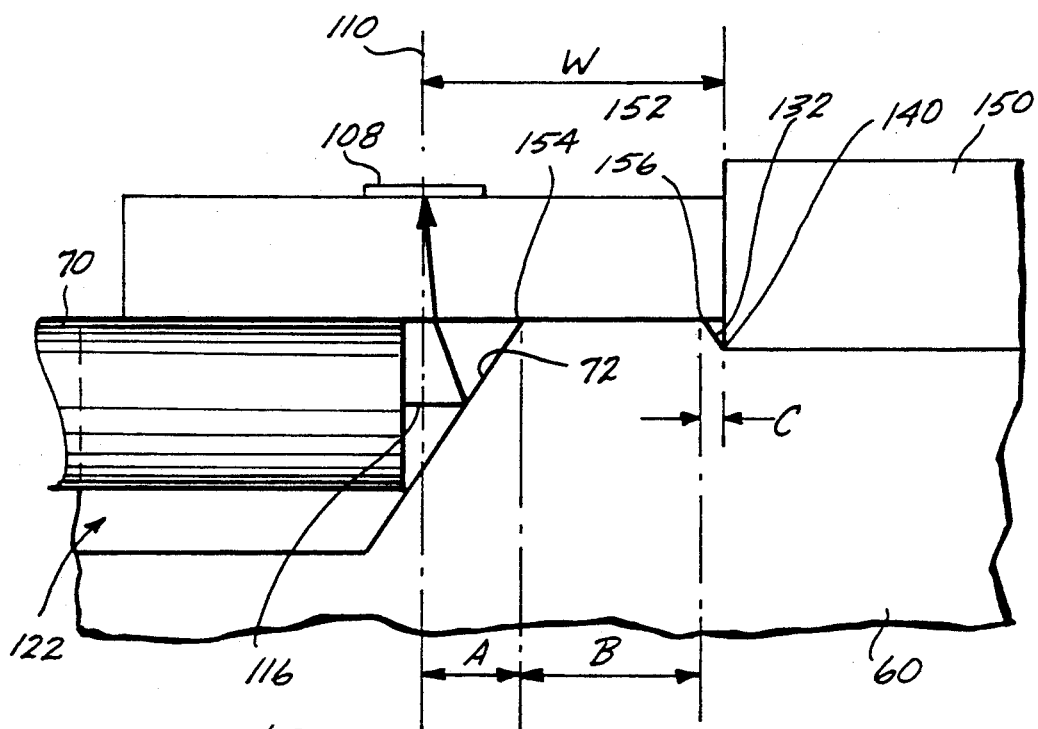
FIG. 10 is a schematic cross-sectional view showing the relationship of a fiber-optic cable end to the electro-optic device for the embodiment of FIG. 9.
Figure 9:
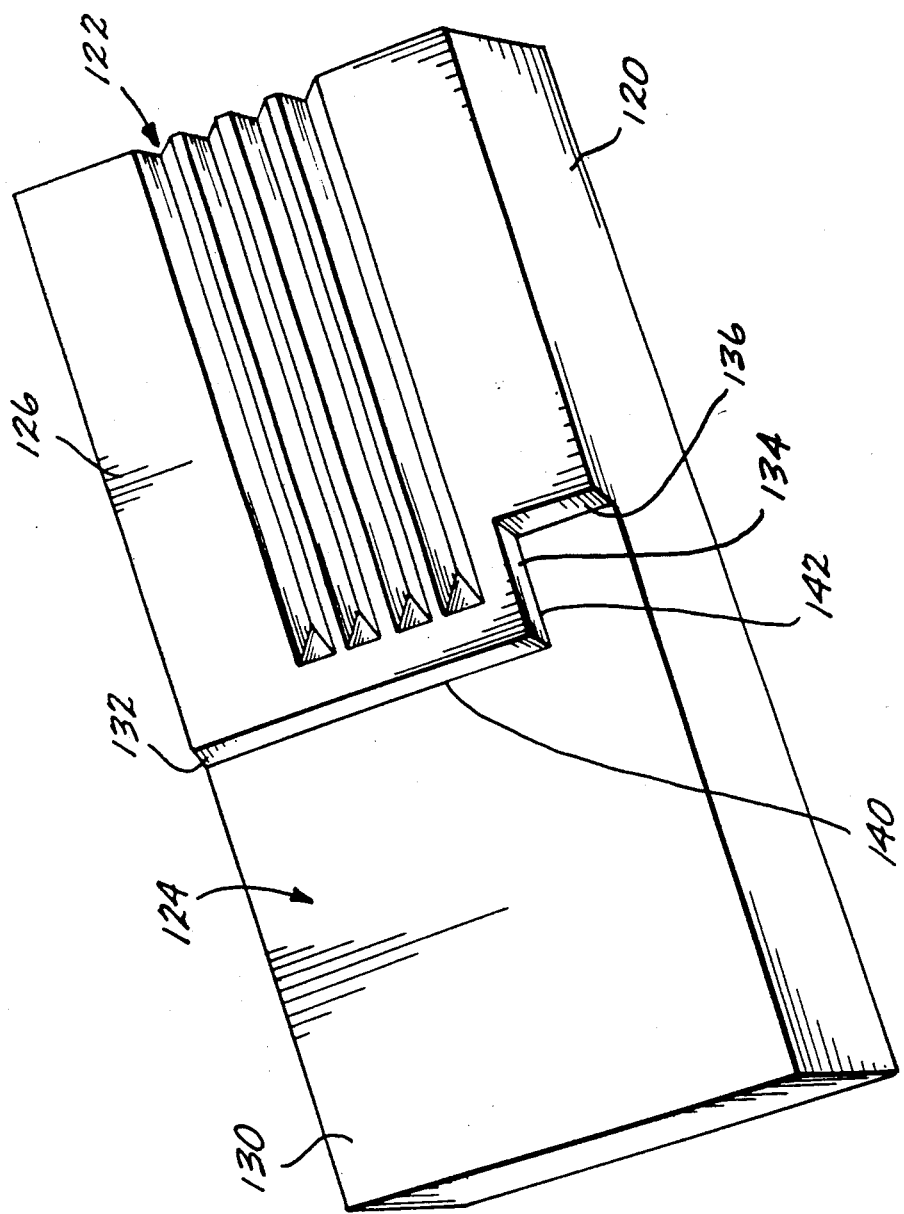
FIG. 9 is a perspective view of the substrate for a second embodiment of the invention.

A second embodiment of the invention is illustrated in FIG. 9 and 10. Referring initially to FIG. 9, working surface 126 of substrate 120 is anisotropically etched to form grooves 122, as with the previous embodiment. Substrate 120 is also anisotropically etched to form recess 124 in working surface 126. Recess 124 plays the role of metal plate 80 in the previous embodiment. Recess 124 includes bottom surface 130 that is parallel to but offset from working surface 126, and side surfaces 132, 134 and 136. The junction between side surface 132 and bottom surface 130 forms alignment edge 140, while the junction between side surface 134 and bottom surface 130 forms alignment edge 142. These alignment edges are used to control the alignment process. Once recess 124 is formed, a pair of temporary alignment blocks are positioned in the recess. This is illustrated in one dimension in FIG. 10. In particular, FIG. 10 shows temporary alignment block 150 having positioning surface 152, block 150 being positioned such that the lowermost edge of positioning surface 152 abuts alignment edge 140. The criteria for alignment is then $$W = A + B + C \quad (2)$$

W and A are as defined above for FIG. 8. B is the distance between end 154 of groove 122 and the upper edge 156 of side surface 132, and C is the distance between upper edge 156 and lower, alignment edge 140 of side surface 132.

Recess 124 may be created by conventional timed etching techniques. A suitable depth for recess 124 is 1 mil. The temporary alignment blocks that are positioned in recess 124 may each comprise a cleaved semiconductor wafer piece, to assure that the positioning surfaces of the temporary alignment blocks are flat and straight to a high degree of precision. Once the electro-optic device is bonded to the substrate, the temporary alignment blocks are removed, and a block containing, for example, a suitable fan-out pattern may be mounted to the substrate. In this case, the size and shape of the block containing the fan-out is noncritical, and is not necessary for the fan-out block to abut the electro-optic array.

While the preferred embodiments of the invention have been illustrated and described, variations will be apparent to those skilled in the art. For example, a separate, isotropic timed etch could be used to form recess 124 in the embodiment shown in FIG. 9, in which case side surfaces 132, 134 and 136 would be essentially normal to bottom surface 130 and working surface 126, rather than slanted as in the illustrated embodiment. In this case, distance C in FIG. 10 would be zero, and the alignment criteria would reduce to Equation 1. Accordingly, the scope of the invention is to be determined by reference to the following claims.

The embodiments of the invention in which an exclusive property or privilege is claimed are defined as follows:

1. A method for fabricating an optical coupler for coupling light between an end of a fiber-optic cable and an optical port of an electro-optic device, the electro-optic device including a reference surface, the method comprising:

providing a substrate having a working surface;

forming a groove in the working surface of the substrate, the groove having a terminating surface and being dimensioned such that the fiber-optic cable can be positioned in the groove with the end of the fiber-optic cable adjacent to the terminating surface;

forming alignment means on the working surface;

securing positioning means to the substrate at a predetermined position using the alignment means, the positioning means including a positioning surface adapted to abut the reference surface of the electro-optic device; and mounting the electro-optic device on the working surface such that the reference surface abuts the positioning surface;

the alignment means being formed such that when the electro-optic device is mounted on the working surface, the optical port is positioned so as to efficiently couple light between the end of the fiber-optic cable and the optical port via reflection off the terminating surface.

2. The method of claim 1, wherein the alignment means comprises a plate formed on the working surface, the plate having an alignment edge, and wherein the step of securing the positioning means to the substrate comprises aligning the positioning surface with the alignment edge.

3. The method of claim 1, wherein the alignment means comprises a recess formed in the working surface so as to form an alignment edge, and wherein the step of securing the positioning means to the substrate comprises aligning the positioning surface with the alignment edge.

4. The method of claim 3, including the additional step of removing the positioning means after the electro-optic device has been mounted on the working surface.

5. The method of claim 1, wherein the electro-optic device includes first and second reference surfaces, wherein the positioning means includes first and second positioning surfaces adapted to abut the first and second reference surfaces respectively, and wherein the mounting step comprises mounting the electro-optic device on the working surface such that the reference surfaces abut the positioning surfaces.

6. The method of claim 1, wherein the coupler is for coupling light between the ends of the plurality of fiber-optic cables and a plurality of optical ports of the electro-optic device, wherein the step of forming a groove comprises forming a plurality of grooves in the working surfaces, and wherein the alignment means is formed such that when the electro-optic device is mounted on working surface, each optical port is positioned so as to efficiently couple light between the end of one of the fiber-optic cables and the optical port via reflection off one of the terminating surfaces.

7. An optical coupler for coupling light between an end of a fiber-optic cable and an optical port of an electro-optic device, the electro-optic device including a reference surface, the optical coupler comprising:

a substrate having a working surface and a groove in the working surface, the groove having a terminating surface and being dimensioned such that the fiber-optic cable can be positioned in the groove with the end of the fiber-optic cable adjacent to the terminating surface;

alignment means on the working surface; and positioning means comprising a positioning surface oriented to abut the reference surface, the positioning means being secured to the substrate at a predetermined position using the alignment means;

the electro-optic device being mounted on the working surface such that the reference surface abuts the positioning surface; and the alignment means being formed such that when the electro-optic device is mounted on the working surface, the optical port is positioned so as to efficiently couple light between the end of the fiber-optic cable and the optical port via reflection off the terminating surface.

8. The coupler of claim 7, wherein the alignment means comprises a plate formed on the working surface, the plate having an alignment edge, and wherein the positioning surface is aligned with the alignment edge.

9. The coupler of claim 7, wherein the alignment means comprises a recess formed in the working surface so as to form an alignment edge, and wherein the positioning surface is aligned with the alignment edge.

10. A coupler of claim 7, wherein the electro-optic device includes first and second reference surfaces, wherein the positioning means includes first and second positioning surfaces adapted to abut the first and second reference surfaces, respectively, and wherein the electro-optic device is mounted on the working surface such that the reference surfaces abut the respective positioning surfaces.

11. The coupler of claim 7, wherein the coupler is for coupling light between the ends of a plurality N of fiber optic cables and N optical ports of the electro-optic device, wherein the working surfaces comprises N grooves, and wherein the alignment means is formed such that when the electro-optic device is mounted on the working surface, each optical port is positioned so as to efficiently couple light between the end of one of the fiber optic cables and the optical port via reflection off one of the terminating surfaces.

12. The coupler of claim 11, wherein the alignment means comprises a plate formed on the working surface, the plate having an alignment edge, wherein the positioning surface is aligned with the alignment edge, and wherein a surface of the positioning means comprises a plurality of electrically conductive traces in a fan-out pattern, for use in connecting the electro-optic device to other electrical circuitry.

* * * * *